April 2, 1963   J. BICHL   3,083,408
MACHINE FOR INJECTION MOLDING OF SELF-HARDENING RESINS
Filed Nov. 18, 1958   2 Sheets-Sheet 1
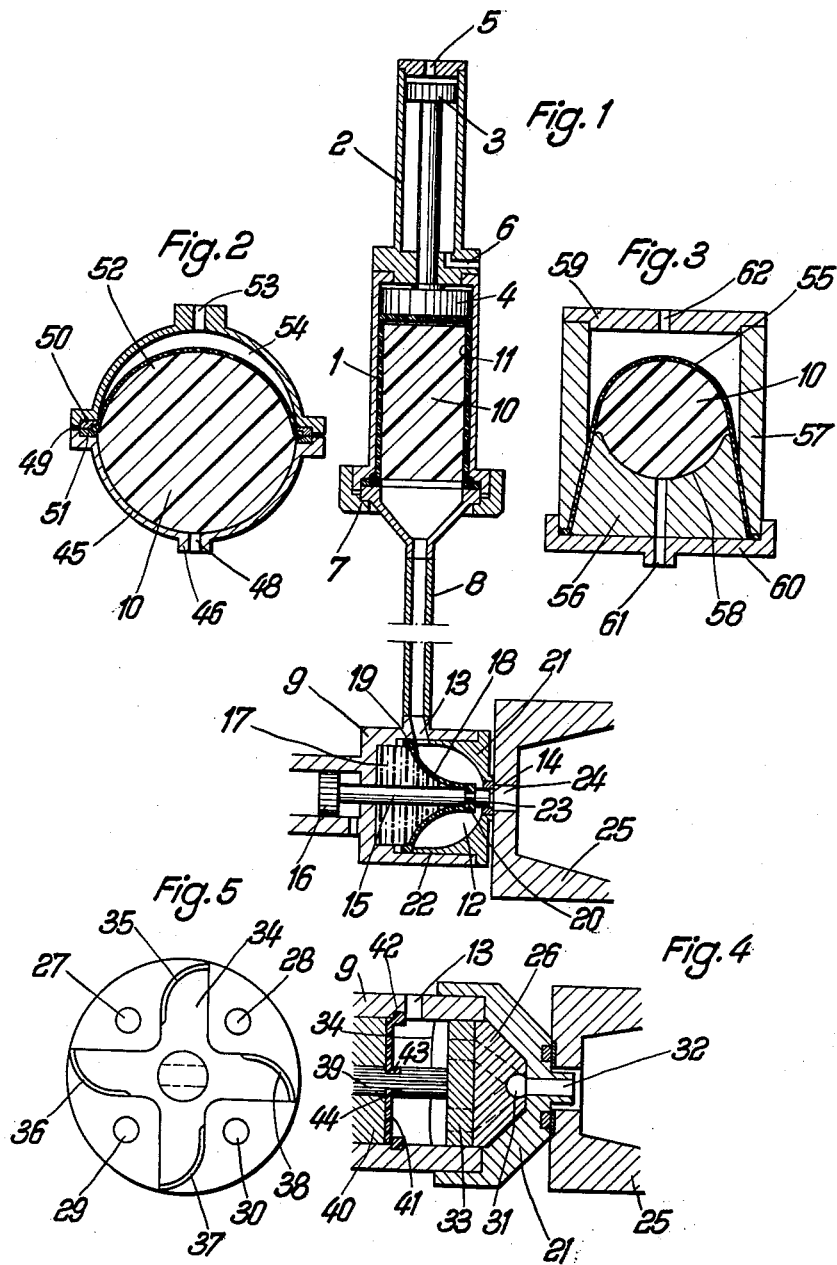
Inventor:

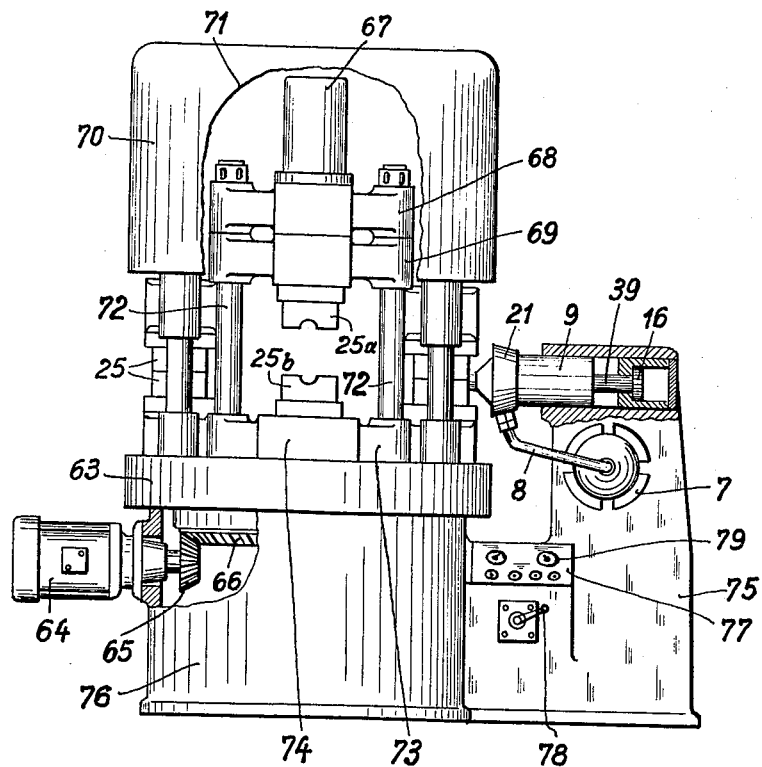

3,083,408
MACHINE FOR INJECTION MOLDING OF SELF-HARDENING RESINS
Josef Bichl, Haus am Moos, Grafrath-Amper, Germany
Filed Nov. 18, 1958, Ser. No. 774,621
Claims priority, application Germany Nov. 21, 1957
2 Claims. (Cl. 18—30)

A number of attempts have been made to injection mold or process in injection molding machines self-hardening synthetic resins by means of the rim-retaining, vacuum sac, pressure sac or vacuum press process or various processes in which superatmospheric pressure is employed. All attempts have failed due to the self-hardening properties of the synthetic resin, which tended to weld, bond and adhesively connect relatively movable solid surfaces contacting each other. The occurrence of such surfaces cannot be avoided in the processing of self-hardening synthetic resins in machines because the synthetic resin must somehow be conveyed and directed, which is always performed by machine members which have moving and mutually contacting surfaces, whether these machine members consist of metals, plastics, ceramics, fiber material, rubber or the like. Whenever self-hardening synthetic resins can enter into the gaps necessarily existing between relatively movable surfaces contacting each other, a resin film will form, which hardens immediately so that the machine members forming these surfaces will bind each other. This film will also be formed between parts, which have been ground one in the other so that the gaps are microscopically small, because the resin is under high pressure and will penetrate even into gaps between machine members ground one in the other. Once the resin has penetrated between the parts, the effect of the hard film will be the worse the finer is the gap. For the same reason it has not been possible to use valves for controlling the flowing mass of the synthetic resin, particularly to divide, stop or start it.

A solution of the difficulties thus characterized is afforded by the process proposed by the invention for injection molding self-hardening synthetic resins, which may contain fillers such as glass fibers and textiles, by keeping the synthetic resin separate from all movable body-defining surfaces by flexible holding means which are non-reactive with respect to the self-hardening synthetic resin throughout the range in which movable body-defining surfaces are encountered, and in which the synthetic resin is in a condition in which it would be likely to harden. The synthetic resin will be in a self-hardening condition whenever the period of time required is sufficient. This will always be the case when the synthetic resin is not displaced by freshly supplied synthetic resin.

The application of this process to the synthetic resin supply involves the provision of an apparatus which is characterized by the provision of a diaphragm or sac of flexible material, which is non-reactive with the synthetic resin and which serves for confining the synthetic resin supply in a reservoir positioned in front of the injection head of the injection molding machine, to prevent the synthetic resin from wetting the inside walls of the machine.

Also of importance is the provision, in the injection head, of a guide surface of flexible material which is non-reactive with the plastic in the injection chamber of the machine, to prevent the synthetic resin from wetting the boundary walls which deflect the synthetic resin from the inlet of the injection chamber to the outlet thereof. This is of special importance when a cutting means must be provided in the injection chamber, which means must be moved and driven to cut filler fibers, particularly of glass or textile material. This cutting means may comprise rotary cutter blades or reciprocating shear rams. In this case the provision of said guide surfaces of flexible materials which are non-reactive with respect to the synthetic resin, particularly of polyvinylchloride and its derivatives, is essential to enable the use of cutting means having such movable surfaces. Owing to its resiliency the flexible material which prevents the self-hardening synthetic resin from wetting the gaps that are necessarily formed, such material follows readily the reciprocating movement, e.g., of a shear ram, and is also capable of applying itself closely to the rotating machine parts so that the synthetic resin cannot penetrate into gaps thus protected. For this reason the invention is essential for the use of such rotary or reciprocating cutting means.

The drawing shows illustrative embodiments of the invention.

FIG. 1 is a longitudinal sectional view showing the improved reservoir and injection head of an injection molding machine of a usual type;

FIG. 2 is a vertical sectional view of a modified reservoir;

FIG. 3 is a sectional view of another form of such reservoir;

FIG. 4 shows a modified form of injection head in longitudinal section;

FIG. 5 is an elevation of the cutter blade mounted for rotation in the injection head; and FIG. 6 is an elevation, partly in section, of an injection molding machine according to this invention.

In FIG. 1, 1 denotes the reservoir of the synthetic resin injection molding machine. The reservoir carries in the usual manner an upward extension 2, which contains the driving piston 3 of the press ram 4, which serves for expelling the synthetic resin from the reservoir and for transferring it into the injection head of the injection molding machine. By means of the connections 5 and 6 the driving piston may be subjected in a manner known per se to the action of a working fluid under pressure, such as pressure oil or compressed air. The reservoir 1 is connected in the usual manner by the flange connection 7 to the supply conduit 8 leading to the injection head 9 of the injection molding machine.

If this device for transferring synthetic resin from the synthetic resin supply 10 to the injection molding machine were not constructed according to the invention it would not be suitable because self-hardening synthetic resins would immediately penetrate into the annular gap between the piston 4 and the cylinder 1 to form there a hardened resin film, so that the piston 4 would bind in the cylinder 1.

This is prevented according to the invention by enclosing the supply 10 of self-hardening synthetic resin with a diaphragm or sac 11 of a flexible material which will not bond with the supply of self-hardening synthetic resin 10. These requirements are met by certain synthetic resins such as polyvinylchloride and its derivatives. Thus, the sac 11 precludes any penetration of self-hardening synthetic resin between parts 4 and 1. On the other hand, the sac 11 is compressible so that the synthetic resin forced out of the cylinder by the press ram 4 can enter the transfer conduit 8 leading to the injection head 9 without difficulty.

The injection head itself forms an injection chamber 12, which has an inlet 13 for the synthetic resin mass forced in from the transfer conduit 8 and an outlet mouthpiece 14, which serves for guiding a shear ram 15, which is also actuated by means of a piston 16. The piston 16 is again under the action of a pressure fluid, which is controlled by known means to permit of a reciprocation of the shear ram 15. The shear ram 15 is guided by the fitting 17, which may consist, e.g., of Teflon (polytetrafluoroethylene). The guide member 18 provided for directing and guiding the synthetic resin entering through parts 8, 13 consists also of flexible material which does not bond with and is non-reactive with respect to the self-hardening synthetic resin. The guide member 18 has beadlike enlargements 19 and 20, which serve to locate the guide member 18 between the parts 9 and 17 and on the shear ram 15. To enable the guide member 18 to be located between parts 9 and 17 the injection head chamber 9 has an end member 21 whereby the bead 19 can be stressed because parts 9 and 21 are interconnected by screw threads 22. A groove 23 receiving the bead 20 is sufficient for locating the guide member 18 on the shear ram 15 by means of the bead 20. Serving to guide the shear ram 15, the guide member 18 thus follows the reciprocation of the shear ram 15 and prevents any wetting of the fitting 17 and of the shear ram 15 on surfaces which are moved and contact each other during the operation of the injection molding machine. The portions of the synthetic resin mass which are divided off by the shear ram 15 pass through the connection opening to the injection molding die 25.

In FIG. 4, 9 is again the injection chamber having the inlet opening 13 for the synthetic resin. The mouthpiece 26 is different in construction, having four inlet ducts 27, 28, 29, 30, which are shown in more detail in FIG. 5. These ducts combine at 31 to form the ejection opening 32, next to which the injection molding die 25 is again disposed. A blade counterplate 33 disposed in front of the mouthpiece 26 has openings registering with the ducts 27–30 and having the same references as the latter. The rotary blade 34 having cutting edges 35, 36, 37, 38 is in engagement with the blade counterplate. The rotary blade 34 is driven by the blade shaft 39 rotatably mounted in the bearing member 40. The bearing member 40 and the blade shaft 39 are also protected by a guide member 41 from being wetted by the self-hardening synthetic resin adjacent to the relatively moving contact surfaces. The guide member 41 has again beads 42 and 43, by which it is located on the wall of the injection chamber 9 and the blade-driving shaft 39. For this purpose the blade shaft 39 has a groove 44 which receives the bead.

FIG. 2 shows the different embodiment of the reservoir. In this case flexible materials which do not bond with the self-hardening synthetic resin are also used for pressurizing the synthetic resin. There is again a reservoir 45 having a connection 46 to the conduit 48. The reservoir is bipartite and forms a parting joint 49, which is adjoined by the gripping rings 50, 51 for gripping the sac-like diaphragm 52, which consists again of flexible material which is non-reactive with respect to the self-hardening synthetic resin 10. A pressure fluid supplied at 53 acts on the diaphragm in the space 54 and causes the self-hardening synthetic resin to emerge out of the conduit 48 without being capable of wetting valves disposed before the connection 53 and having moving surfaces in contact with each other to that these valves would become inoperative if the self-hardening synthetic resin had access to them.

FIG. 3 shows another embodiment, in which the sac 55 of flexible material is gripped between the base part 56 and the top part, which forms at the same time the wall of the reservoir. The base part 56 has a concave depression 58 so that the supply of self-hardening resin 10 can be accommodated between the base part 56 and the sac 55. End members 59, 60 close the structure toward the outside. 61 is again a connection to the conduit 8. Valve-controlled conduits are connected at 62 so that an access of self-hardening synthetic resin to the moved valve surfaces must be prevented. This is achieved by the provision of the sac 55.

FIG. 6 shows an injection molding machine which is constructed according to the invention and comprises a revolving table 63 for four dies 25, which may be replaced by any other number of dies, of course. The revolving table 63 is driven by the electric motor 64 through the intermediary of the pinion 65 and the gear rim 66 to move any of the dies selectively to a position in which it registers with the injection head 21 (see FIG. 4). The dies, which may be bipartite, as is indicated at 25a and 25b, are under the influence of a hydraulically effective closing and opening device, which is arranged under the closed hood 70 of the machine. This hood is shown broken away at 71. The cylinder 67 is shown, which is supported by the fixed beam 68 and contains the press ram. The drawing shows also the movable beam 69, which is guided on columns 72. The movable beam 69 carries the top part 25a of the die whereas the base part 25b is held at 74 on the stationary lower cross-beam 73. The injection head 21 with the guide cylinder 9 for the press ram 16 are accommodated in a lateral extension 75 of the machine frame. This extension 75 accommodates also the other parts shown in FIGS. 1 and 4. The connecting flange for the transfer conduit 8 leading from the reservoir 1 to the injection head 21 is apparent at 7. Extending axially from the connecting flange 7 the reservoir 1 is apparent only in FIG. 6 rather than in FIG. 1. 77 is the control station of the machine, comprising the switches 78, the measuring instruments 79 and the relays (not shown) as well as the terminals for and junctions of the electrical conductors. The switches 78 serve for controlling the hydraulic press rams 67 and 347 and 16 and for energizing and deenergizing the electric motor 64.

These self-hardening resins when cured, are characterized by a cross-linked network of polymeric chains.

It is understood that the inventor intends to claim, as a part of his invention, any variation, substitution and changes that lie within the scope of the invention and the hereinafter appended claims and intends to include within the scope of said claims such changes as may be apparent to those skilled in the art in the practice of the principles of this invention and within the scope as set forth in the hereinabove-stated specification.

What is claimed is:

1. An injection molding machine for injecting a self-hardening synthetic resin into a mold, said machine comprising a cylinder, a sac-like diaphragm of inert non-metallic flexible material peripherally attached to the front end of the cylinder and adapted to receive said resin and to shield the inside wall of the cylinder therefrom, said diaphragm being in close face-to-face contact with the inside wall of the cylinder, means for exerting a continuous and unidirectional pressure upon the said diaphragm to expel sufficient resin therefrom to fill the entire mold, a resin delivery conduit leading from the front end of the cylinder, and an injection head connected to said conduit, said head having a chamber in communication with said conduit, a mouthpiece forming the front wall of said chamber, a plunger guided for reciprocation in said chamber to push the resin through said mouthpiece, and a flexible member of inert material peripherally attached to the rear portion of the inner wall of the head and centrally fastened to the plunger at the front end thereof.

2. An injection molding machine for injecting a self-hardening synthetic resin into a mold, said machine comprising a cylinder adapted to contain a charge of said resin, a diaphragm of inert flexible material peripherally attached to the inside wall of the cylinder for shielding said wall from the resin, a plunger slidable in the cylinder for exerting a forward force upon the rear side of the diaphragm to cause the diaphragm to push the resin in front of it, a resin delivery conduit connected to the front end of the cylinder, an injection head having a chamber in communication with the conduit, a mouthpiece at the front end of said head, a plunger guided for reciprocation in said chamber, and a guide member of inert flexible material peripherally fastened to the inside wall of the head and centrally fastened to the front end of the plunger for shielding the rear parts of the plunger from the resin.

References Cited in the file of this patent

UNITED STATES PATENTS

| | | |
|---|---|---|
| 1,863,854 | Jeffery | June 21, 1932 |
| 2,180,818 | Fields | Nov. 21, 1939 |
| 2,327,079 | Wacker | Aug. 17, 1943 |
| 2,338,607 | Wacker | Jan. 4, 1944 |
| 2,422,990 | Spanier | June 24, 1947 |
| 2,512,275 | Hawk | June 20, 1950 |
| 2,565,949 | Clifford et al. | Aug. 28, 1951 |
| 2,705,342 | Hendry | Apr. 5, 1955 |
| 2,750,957 | Tavola | June 19, 1956 |
| 2,792,594 | Keaton et al. | May 21, 1957 |

FOREIGN PATENTS

| | | |
|---|---|---|
| 205,753 | Australia | Aug. 11, 1955 |
| 508,557 | Belgium | Feb. 15, 1952 |